(12) United States Patent
Deshmukh et al.

(10) Patent No.: US 11,262,979 B2
(45) Date of Patent: Mar. 1, 2022

(54) MACHINE LEARNING WEBPAGE ACCESSIBILITY TESTING TOOL

(71) Applicant: BANK OF AMERICA CORPORATION, Charlotte, NC (US)

(72) Inventors: Paresh Deshmukh, Princeton Junction, NJ (US); Yacine Arbani, Doylestown, PA (US)

(73) Assignee: Bank of America Corporation, Charlotte, NC (US)

(*) Notice: Subject to any disclaimer, the term of this patent is extended or adjusted under 35 U.S.C. 154(b) by 12 days.

(21) Appl. No.: 16/796,182

(22) Filed: Feb. 20, 2020

(65) Prior Publication Data

US 2021/0081165 A1 Mar. 18, 2021

Related U.S. Application Data

(60) Provisional application No. 62/902,037, filed on Sep. 18, 2019.

(51) Int. Cl.
| | | |
|---|---|---|
| *G06F 3/16* | (2006.01) | |
| *G06N 20/00* | (2019.01) | |
| *G10L 15/22* | (2006.01) | |
| *G06F 40/143* | (2020.01) | |
| *G10L 15/26* | (2006.01) | |

(52) U.S. Cl.
CPC ............ *G06F 3/167* (2013.01); *G06F 40/143* (2020.01); *G06N 20/00* (2019.01); *G10L 15/22* (2013.01); *G10L 15/26* (2013.01); *G10L 2015/223* (2013.01)

(58) Field of Classification Search
CPC ....... G06F 3/167; G06F 40/143; G06N 20/00; G10L 15/22; G10L 15/26; G10L 2015/223
See application file for complete search history.

(56) References Cited

U.S. PATENT DOCUMENTS

| | | | |
|---|---|---|---|
| 2,958,749 A | 11/1960 | Brackett | |
| 5,792,854 A | 8/1998 | Lane et al. | |
| 6,587,879 B1 | 7/2003 | Reynolds | |
| 6,697,964 B1* | 2/2004 | Dodrill | G06F 11/3414 709/200 |
| 6,889,337 B1* | 5/2005 | Yee | G06F 11/3688 434/116 |
| 6,981,246 B2 | 12/2005 | Dunn | |
| 7,054,952 B1* | 5/2006 | Schwerdtfeger | H04L 67/2823 709/246 |

(Continued)

*Primary Examiner* — Jeremy L Stanley

(57) ABSTRACT

An apparatus includes a memory and a hardware processor. The processor receives a voice signal associated with an element of a website. Navigating to the element includes performing a user interaction with a browser configured to display the website. In response to receiving the voice signal, the processor converts the voice signal to an input command that simulates the user interaction and executes the input command. The processor then monitors a behavior of the browser and applies a machine learning algorithm to the behavior to determine whether the website is compliant with a set of rules. The machine learning algorithm determines whether the website is compliant based at least in part on the voice signal and the browser behavior. In response to determining that the website is not compliant with the set of rules, the processor records a violation in an error log.

20 Claims, 4 Drawing Sheets

(56) References Cited

U.S. PATENT DOCUMENTS

| | | | |
|---|---|---|---|
| 7,219,136 B1* | 5/2007 | Danner | G06Q 20/16 |
| | | | 379/67.1 |
| 7,688,712 B2 | 3/2010 | Glapin et al. | |
| 7,797,294 B2 | 9/2010 | Gartner et al. | |
| 7,836,399 B2* | 11/2010 | Gurcan | G06F 40/143 |
| | | | 715/249 |
| 7,840,948 B2 | 11/2010 | Chace | |
| 8,196,104 B2 | 6/2012 | Cohrs et al. | |
| 8,369,326 B2 | 2/2013 | Ansari et al. | |
| 8,649,386 B2 | 2/2014 | Ansari et al. | |
| 8,667,468 B2* | 3/2014 | Breeds | G06F 11/3684 |
| | | | 717/125 |
| 8,719,365 B1 | 5/2014 | Scheinost et al. | |
| 8,726,351 B2 | 5/2014 | Metzer et al. | |
| 9,292,604 B2 | 3/2016 | Choudhary et al. | |
| 9,483,470 B2* | 11/2016 | Gallo | G06F 11/3438 |
| 9,563,422 B2* | 2/2017 | Cragun | G06F 11/3668 |
| 9,569,587 B2 | 2/2017 | Ansari et al. | |
| 9,600,401 B1* | 3/2017 | Haischt | G06F 11/3664 |
| 9,602,880 B2 | 3/2017 | Ansari et al. | |
| 9,996,613 B2 | 6/2018 | Jadhav et al. | |
| 10,169,188 B2 | 1/2019 | Belekar et al. | |
| 10,241,808 B2 | 3/2019 | Kolagatla et al. | |
| 10,324,596 B2 | 6/2019 | Cragun et al. | |
| 10,394,579 B2 | 8/2019 | Nandakumar et al. | |
| 10,423,709 B1* | 9/2019 | Bradley | G06F 40/16 |
| 10,438,170 B2 | 10/2019 | Kozloski et al. | |
| 10,614,156 B1* | 4/2020 | Stansell | G06F 40/117 |
| 10,762,280 B2* | 9/2020 | Bradley | G06F 40/14 |
| 2002/0003547 A1* | 1/2002 | Wang | G06F 16/957 |
| | | | 715/727 |
| 2002/0010715 A1* | 1/2002 | Chinn | G06F 3/16 |
| | | | 715/236 |
| 2002/0032564 A1* | 3/2002 | Ehsani | G06F 40/289 |
| | | | 704/235 |
| 2002/0065658 A1* | 5/2002 | Kanevsky | G06F 16/9574 |
| | | | 704/260 |
| 2002/0077823 A1* | 6/2002 | Fox | G06F 8/34 |
| | | | 704/260 |
| 2002/0138616 A1* | 9/2002 | Basson | H04L 67/2814 |
| | | | 709/225 |
| 2002/0156799 A1* | 10/2002 | Markel | G06F 16/958 |
| 2002/0194388 A1* | 12/2002 | Boloker | G06F 8/38 |
| | | | 719/310 |
| 2003/0174155 A1* | 9/2003 | Weng | H04M 3/4936 |
| | | | 715/700 |
| 2004/0070612 A1* | 4/2004 | Sinclair | G06F 9/451 |
| | | | 715/762 |
| 2004/0128136 A1* | 7/2004 | Irani | H04M 3/4938 |
| | | | 704/270.1 |
| 2004/0162738 A1* | 8/2004 | Sanders | G06Q 50/188 |
| | | | 705/80 |
| 2005/0033577 A1* | 2/2005 | Bradley | G06F 3/0484 |
| | | | 704/270.1 |
| 2005/0120308 A1* | 6/2005 | Gibson | G06F 9/451 |
| | | | 715/779 |
| 2006/0026464 A1 | 2/2006 | Atkin et al. | |
| 2006/0277250 A1 | 12/2006 | Cherry et al. | |
| 2007/0074167 A1 | 3/2007 | Cohrs et al. | |
| 2007/0208687 A1* | 9/2007 | O'Conor | G06F 16/957 |
| 2008/0189115 A1* | 8/2008 | Mayer-Ullmann | G09B 21/008 |
| | | | 704/275 |
| 2009/0228573 A1* | 9/2009 | Asakawa | G09B 5/04 |
| | | | 709/218 |
| 2010/0217837 A1 | 8/2010 | Ansari et al. | |
| 2010/0251217 A1* | 9/2010 | Miller | G06F 11/3664 |
| | | | 717/126 |
| 2011/0026889 A1 | 2/2011 | Risch et al. | |
| 2011/0154212 A1* | 6/2011 | Gharpure | G09B 21/009 |
| | | | 715/738 |
| 2012/0023485 A1* | 1/2012 | Dubey | G06F 11/3684 |
| | | | 717/125 |
| 2012/0324424 A1* | 12/2012 | Breeds | G06F 11/3684 |
| | | | 717/110 |
| 2013/0311485 A1* | 11/2013 | Khan | G06F 16/335 |
| | | | 707/748 |
| 2013/0332815 A1* | 12/2013 | Gallo | G06F 40/14 |
| | | | 715/234 |
| 2014/0058733 A1* | 2/2014 | Voorhees | G09B 21/006 |
| | | | 704/260 |
| 2014/0089772 A1* | 3/2014 | Shetty | G06F 16/958 |
| | | | 715/206 |
| 2014/0351796 A1 | 11/2014 | Gur-esh et al. | |
| 2015/0074259 A1 | 3/2015 | Ansari et al. | |
| 2015/0127665 A1* | 5/2015 | Keohane | G06F 16/955 |
| | | | 707/751 |
| 2015/0169545 A1* | 6/2015 | Eisen | G06F 40/30 |
| | | | 704/9 |
| 2015/0205882 A1* | 7/2015 | Vukas | G06F 11/3664 |
| | | | 707/758 |
| 2015/0243288 A1* | 8/2015 | Katsuranis | G06F 3/167 |
| | | | 704/275 |
| 2015/0336578 A1* | 11/2015 | Lord | B60T 7/22 |
| | | | 701/2 |
| 2016/0147544 A1* | 5/2016 | Kaplan | G06F 21/45 |
| | | | 715/712 |
| 2016/0247110 A1* | 8/2016 | Sinha | G06Q 10/109 |
| 2016/0306784 A1* | 10/2016 | Bradley | G10L 25/48 |
| 2017/0090686 A1* | 3/2017 | Blumenkron Hurtado | |
| | | | G06F 3/0489 |
| 2017/0147554 A1* | 5/2017 | Chen | G06F 3/167 |
| 2017/0220972 A1 | 8/2017 | Conway | |
| 2017/0269816 A1* | 9/2017 | Bradley | G10L 15/22 |
| 2017/0286402 A1* | 10/2017 | Eisen | G06F 40/30 |
| 2017/0344703 A1 | 11/2017 | Ansari et al. | |
| 2018/0018254 A1* | 1/2018 | Bansal | G06F 11/3684 |
| 2018/0123819 A1* | 5/2018 | Ansari | C07D 417/14 |
| 2018/0137025 A1* | 5/2018 | Zhang | G06F 11/3688 |
| 2018/0165258 A1* | 6/2018 | Scoda | G06F 11/3688 |
| 2018/0275989 A1* | 9/2018 | Kakkad | G06F 11/3409 |
| 2018/0329581 A1* | 11/2018 | Liu | G06F 16/957 |
| 2019/0013006 A1* | 1/2019 | Boxwell | G06F 40/211 |
| 2019/0042397 A1* | 2/2019 | Vignesh R | G06F 11/3696 |
| 2019/0050392 A1* | 2/2019 | Clements | G06F 40/274 |
| 2019/0057333 A1 | 2/2019 | Jenkins | |
| 2019/0080296 A1* | 3/2019 | Crow | G09B 5/10 |
| 2019/0112591 A1 | 4/2019 | Farha et al. | |
| 2019/0235998 A1 | 8/2019 | Fisher | |
| 2019/0239281 A1 | 8/2019 | Wu et al. | |
| 2019/0279627 A1* | 9/2019 | Wang | G06F 16/634 |
| 2020/0026640 A1* | 1/2020 | Dhanaraj | G06F 11/3684 |
| 2020/0065857 A1* | 2/2020 | Lagi | G06F 16/9535 |
| 2020/0117588 A1* | 4/2020 | McBride | G06F 11/3692 |
| 2020/0184965 A1* | 6/2020 | Costa Villas Boas Segura | |
| | | | G10L 15/02 |
| 2020/0234697 A1* | 7/2020 | Webster | G10L 15/30 |
| 2020/0234699 A1* | 7/2020 | Webster | G06F 40/53 |
| 2020/0371754 A1* | 11/2020 | P K | G06F 3/01 |

\* cited by examiner

MACHINE LEARNING WEBPAGE ACCESSIBILITY TESTING TOOL

RELATED APPLICATIONS

This application claims priority to U.S. Provisional Application Ser. No. 62/902,037 entitled "WEBPAGE ACCESSIBILITY TESTING TOOL," filed Sep. 18, 2019, the entire content of which is incorporated herein by reference.

TECHNICAL FIELD

This invention relates generally to machine learning, and specifically to a machine learning web site accessibility testing tool.

BACKGROUND

Title III of the Americans with Disabilities Act (ADA) prohibits discrimination on the basis of disability in "places of public accommodation." This phrase has been interpreted to include websites in addition to physical locations. Accordingly, to avoid violating Title III, website developers should ensure that their websites are accessible to persons with disabilities. For example, the webpages belonging to a website should be accessible to low vision users, who may navigate the webpages using screen readers and simple keyboard commands.

SUMMARY

This disclosure contemplates a machine learning website accessibility testing tool that may be used to test the compliance of a website with both ADA rules as well as any custom rules a developer may choose to specify. The tool is designed to operate in conjunction with a screen reader. When a webpage loads, the screen reader begins reading the page from the top down. The tool converts the audio output of the screen reader to simulated user interactions (for example, keystrokes). For example, the tool listens for instructions and requests for inputs from the screen reader and responds based on those instructions/requests. As an example, if the screen reader reads a set of links that a user may navigate to by pressing the TAB keyboard key, the tool may test whether such links are available through the TAB key. If a link is not available, the tool may store a record of this in an error log. In certain embodiments, the tool may use a machine learning algorithm, trained based on previous ADA testing sessions, to determine whether a web site is ADA compliant. For example, the machine learning algorithm may monitor the behavior of the website in response to the simulated user interactions and determine whether this behavior is consistent with ADA compliance. After the tool has finished processing a page, a developer may examine the error log to identify issues for remediation. Certain embodiments of the tool are described below.

According to one embodiment a system includes a memory, a display, and a hardware processor communicatively coupled to the memory. The memory stores a screen reader application and a machine learning algorithm. The display displays a browser. The hardware processor loads a website into the browser. The website includes a plurality of elements. The processor also launches the screen reader application. The screen reader application is configured to generate voice signals associated with the plurality of elements. The processor additionally receives a first voice signal from the screen reader application. The first voice signal is associated with a first element of the plurality of elements. Navigating to the first element includes performing a first user interaction. In response to receiving the first voice signal, the processor converts the first voice signal to a first input command. The first input command simulates the first user interaction. The processor further executes the first input command. In response to executing the first input command, the processor monitors a first behavior of the browser. The processor also applies the machine learning algorithm to the first behavior of the browser to determine whether the website is compliant with a set of rules. The machine learning algorithm determines whether the website is compliant with the set of rules based at least in part on the first voice signal and the first behavior of the browser. In response to determining that the website is not compliant with the set of rules, the processor records a violation associated with the first voice signal in an error log.

According to another embodiment a method includes loading a website into a browser. The website includes a plurality of elements. The method also includes launching a screen reader application. The screen reader application is configured to generate voice signals associated with the plurality of elements. The method additionally includes receiving a first voice signal from the screen reader application. The first voice signal is associated with a first element of the plurality of elements. Navigating to the first element includes performing a first user interaction. In response to receiving the first voice signal, the method includes converting the first voice signal to a first input command. The first input command simulates the first user interaction. The method further includes executing the first input command. In response to executing the first input command, the method includes monitoring a first behavior of the browser. The method also includes applying a machine learning algorithm to the first behavior of the browser to determine whether the website is compliant with a set of rules. The machine learning algorithm determines whether the website is compliant with the set of rules, based at least in part on the first voice signal and the first behavior of the browser. In response to determining that the website is not compliant with the set of rules, the method includes recording a violation associated with the first voice signal in an error log.

According to a further embodiment an apparatus includes a memory and a hardware processor communicatively coupled to the memory. The hardware processor receives a first voice signal associated with a first element of a web site. Navigating to the first element of the website includes performing a first user interaction with a browser configured to display the website. In response to receiving the first voice signal, the processor converts the first voice signal to a first input command. The first input command simulates the first user interaction. The processor additionally executes the first input command. In response to executing the first input command, the processor monitors a first behavior of the browser. The processor additionally applies a machine learning algorithm to the first behavior of the browser to determine whether the website is compliant with a set of rules. The machine learning algorithm determines whether the website is compliant with the set of rules, based at least in part on the first voice signal and the first behavior of the browser. In response to determining that the website is not compliant with the set of rules, the processor records a violation associated with the first voice signal in an error log.

Certain embodiments of the tool provide one or more technical advantages. For example, an embodiment facilitates communication between a pair of separate systems by converting the output of the first system into a form usable by the second system. In particular, the tool converts the voice output of a screen reader into a set of keystrokes (or similar inputs) that may be understood by a web browser. As another example, an embodiment leverages historical data to improve the efficiency and increase the accuracy of the ADA compliance testing process, thereby reducing the computation resources otherwise consumed during testing. The system described in the present disclosure may particularly be integrated into a practical application of an internet browser plug-in that may operate in conjunction with a screen reader, to identify ADA compliance issues with webpages loaded in the browser. The plug-in is configured to convert the output of the screen reader into a set of keystrokes (and/or similar inputs) that may be understood by the browser, execute the keystrokes, and use a machine learning algorithm to determine whether the resulting behavior of the browser is consistent with ADA compliance. In this manner, ADA compliance testing for a website may be performed on a local device, without sending the html code corresponding to the website to a remote location, as is common with previous ADA compliance testing methods. Accordingly, the plug-in may help to conserve network resources in addition to the processing resources that may be saved as a result of the improved efficiency and accuracy of the machine learning algorithm, as compared with previous ADA compliance testing methods.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
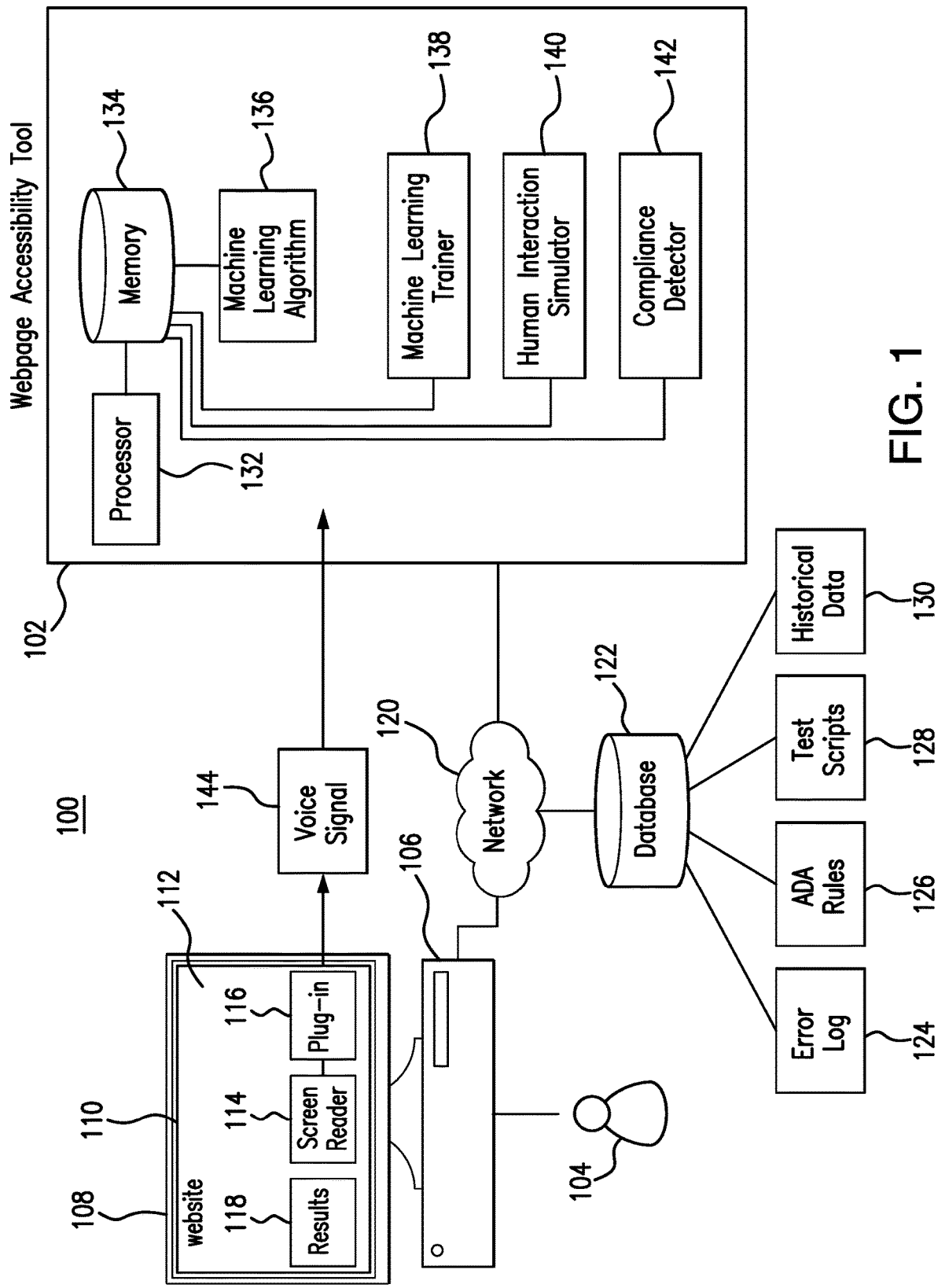
FIG. 1 illustrates an example system.

FIG. 1 illustrates an example system 100. As seen in FIG. 1, system 100 includes webpage accessibility tool 102, device 106, display 108, screen reader 114, ADA compliance plug-in 116, network 120, and database 122.

Device 106 is used to control display 108. In particular, device 106 is used to display browser 110 on display 108. Browser 110 is any web browser that may be used to load and display webpages received over network 120 on display 108. For example, browser 110 may be the Mozilla Firefox™ browser, the Google Chrome™ browser, the Microsoft Internet Explorer™ browser, the Apple Safari™ browser, and/or any other suitable web browser. Browser 110 may be installed on device 106. For example, browser 110 may include non-transitory computer readable instructions stored in a memory of device 106 and executed by a processor of device 106.

Device 106 is also used to control the operation of screen reader 114 and ADA compliance plug-in 116, both of which may be installed on device 106. ADA compliance plug-in 116 may be a plug-in for browser 110, operating within browser 110 and supplementing the native capabilities of browser 110. As described in further detail below, tool 102 operates in conjunction with screen reader 114 and ADA compliance plug-in 116 to determine the ADA compliance of a webpage 112 loaded in browser 110.

Devices 106 include any appropriate device for communicating with components of system 100 over network 120, using browser 110 to display a webpage 112 on display 108, and/or operating screen reader 114 and ADA compliance plug-in 116. In certain embodiments, and as illustrated in FIG. 1, device 106 may be separate from display 108. For example, display 108 may be an external monitor and device 106 may be a desktop computer, a server, and/or any other computational device that may be connected to an external monitor. In some embodiments, display 108 may be integrated with device 106. For example, device 106 may be a smart phone, a tablet, a laptop, an automated assistant, or any other suitable device that includes a display as an integral part of the device. This disclosure contemplates devices 106 being any appropriate device for sending and receiving communications over network 120. Device 106 may also include a user interface, such as a display, a microphone, keypad, or other appropriate terminal equipment. In some embodiments, an application executed by device 106 may perform the functions described herein.

Screen reader 114 is designed for low-vision users 104, and may be used to assist such users in navigating the information displayed on browser 110. For example, screen reader 114 may be the JAWS™ screen reader, the ChromeVox™ screen reader, the COBRA™ screen reader, the NonVisual Desktop Access (NVDA™) screen reader, or any other screen reader. Screen reader 114 may include a speech synthesizer that cooperates with a sound card of device 106 to read aloud information displayed by browser 110 on display 108 of device 106. For example, screen reader 114 may read/process a webpage 112 displayed in browser 112. In addition to reading the text of webpage 112, as displayed on display 108, screen reader 120 may also read alternative text, descriptive headings, and/or descriptive link text that is included in the html code of webpage 112. For example, because screen readers cannot describe images or other graphical information of webpage 112, as displayed in browser 110, the html code of webpage 112 may include alternative text that provides a description of the image and/or graphical information displayed. Screen reader 120 may read such alternative text to provide user 104 with a description of the image and/or graphical information displayed in browser 110. Similarly, rather than simply reading an actual link displayed in browser 110 in a non-descriptive form, such as "Click Here," screen reader 114 may read descriptive link text provided in the html code of webpage 112, which describes the link's purpose and/or to where the link leads. Additionally, screen reader 114 may read the number of frames in webpage 112 and/or the number of links in the frame currently being displayed, and/or any other suitable information associated with webpage 112.

User 104 may interact with screen reader 114 is any suitable manner. For example, in certain embodiments, user 104 may interact with screen reader 114 through the use of simple keyboard commands (keystrokes), cursor movements generated by a mouse device, and/or gestures performed by user 104 directly on display 108. As example, a user may switch between links displayed on webpage 112 using the TAB key. As another example, screen reader 114 may read a portion of webpage 112 in response to user 104 hovering a cursor over that portion of the page.

Plug-in 116 is configured to interact with screen reader 114 to test the accessibility of webpage 112, displayed using browser 110. In certain embodiments, plug-in 116 may display the results of its ADA compliance testing on a portion 118 of display 108. Plug-in 116 may be installed on device 106 and run in browser 110, to supplement the browser's native capability. Plug-in 116 may include instructions that, when executed by device 106, are configured to receive the output 144 of screen reader 114 and to communicate this output with webpage accessibility tool 102. An example algorithm for plug-in 116 is as follows: (1) launch screen reader 114 in browser 110, (2) listen for output 144 from screen reader 114, (3) communicate output 144 to webpage accessibility tool 102, (4) receive results 118 of the ADA compliance testing performed by webpage accessibility tool 102, and (5) display results 118 in browser 110.

While illustrated in FIG. 1 as separate from webpage accessibility tool 102, in certain embodiments, plug-in 116 may include webpage accessibility tool 102. For example, webpage accessibility tool 102 may be installed directly on device 106 as part of plug-in 116. In such embodiments, processor 132 and memory 134, which are used to perform the functions of webpage accessibility tool 102, may be the processor and the memory of device 106. In some embodiments, webpage accessibility tool 102 is separate from plug-in 116. For example, plug-in 116 may communicate the output 144 of screen reader 114 with webpage accessibility tool 102 over network 120. In some embodiments, plug-in 116 may include some components of webpage accessibility tool 102, while other components of webpage accessibility tool 102 may be located remotely from plug-in 115. For example, plug-in 116 may include human interaction simulator 140 and compliance detector 142 (both of which are described in detail below), while machine learning trainer 138 is located remotely from plug-in 116.

Network 120 facilitates communication between and amongst the various components of system 100. This disclosure contemplates network 120 being any suitable network operable to facilitate communication between such components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

As seen in FIG. 1, webpage accessibility tool 102 includes a processor 132 and a memory 134. This disclosure contemplates processor 132 and memory 134 being configured to perform any of the functions of webpage accessibility tool 102 described herein. Generally, webpage accessibility tool 102 operates in conjunction with plug-in 116 to detect ADA compliance issues for websites that include a set of webpages 112 loaded by web browser 110 and stores these detected issues as errors in error log 124. In particular, webpage accessibility tool 102 implements machine learning trainer 138 to train machine learning algorithm 136 to detect ADA compliance issues with webpages 112, human interaction simulator 140 to convert voice signals 144 received from screen reader 114 into simulated interactions between a user and webpage 112, and compliance detector 142 to monitor the behavior of browser 110 in response to human interaction simulator 140 executing the simulated user interactions and to implement machine learning algorithm to determine if this monitored behavior is consistent with ADA compliance.

Machine learning trainer 138 may be a sub-processing component of webpage accessibility tool 102. For example, machine learning trainer 138 may include non-transitory computer readable instructions stored in memory 134 and executed by processor 132. Machine learning trainer 138 is configured to train machine learning algorithm 136 to identify ADA compliance issues with webpages 112. Machine learning trainer 138 may train machine learning algorithm 136 based on ADA rules 126 and/or historical data 130 stored in database 122. Historical data 130 may include any appropriate data that may be used to train machine learning algorithm 136 to determine the ADA compliance of a set of webpages 112, based on the behavior of browser 110 in response to user interactions (simulated or otherwise) with webpages 112, prompted by voice signals 144 generated while screen reader 114 reads webpages 112. For example, in certain embodiments, historical data 130 may include data obtained during ADA testing sessions performed by users 104. For example, historical data 130 may include voice signals 144 transmitted by screen reader 114 and/or text associated with voice signals 144 transmitted by screen reader 144 (e.g., the output of a voice-to-text conversion of voice signals 144). Historical data 130 may also include input commands entered by user 104 in response to receiving voice signals 144, as well as the behavior of browser 110 (e.g., the behavior of the website under consideration) in response to user 104 entering such input commands. Historical data 130 may additionally include a classification made by user 104 of the behavior of the website under consideration as either ADA compliant or non-compliant. As another example, in some embodiments, historical data 130 may include data obtained during previous ADA testing sessions performed by webpage accessibility tool 102. For example, historical data 130 may include data associated with previous determinations of ADA compliance and/or non-compliance along with indications of whether those previous determinations were correct. Such indications may be generated by a system administrator tasked with reviewing the previous determinations.

An example algorithm for machine learning trainer 138 is as follows: (1) access historical data 130, (2) for each previous determination of ADA compliance or non-compliance in historical data 130, provide the data upon which such determination was made to machine learning algorithm 136, (3) receive the output of machine learning algorithm 136, (4) if the output of machine learning algorithm 136 is inconsistent with the previous determination of ADA compliance or non-compliance, adjust machine learning algorithm 136 based on this inconsistency.

Human interaction simulator 140 may be a sub-processing component of webpage accessibility tool 102. For example, human interaction simulator 140 may include non-transitory computer readable instructions stored in memory 134 and executed by processor 132. Human interaction simulator 140 is configured to (1) receive voice signals generated by screen reader 114, while screen reader 114 reads webpage 112, (2) convert the voice signals into simulated user interactions, and (3) execute the simulated user interactions with webpage 112. For example, human interaction simulator 140 may receive voice signals 114, convert the voice signals to text, using a voice to text algorithm, and convert the text to simulated user interactions. In certain embodiments, human interaction simulator 140 may convert the text to simulated user interactions using a machine learning algorithm trained to convert textual instructions into simulated user interactions. For example, in some embodiments, the machine learning algorithm may include a natural language processing algorithm to convert the textual instructions into simulated user interactions.

An example algorithm for human interaction simulator 140 is as follows: (1) receive voice signal 144 from screen reader 114, (2) use a voice to text algorithm to convert voice signal 144 to text, (3) use a machine learning algorithm to convert the text to a simulated user interaction, (4) execute the simulated user interaction in browser 110.

This disclosure contemplates that the simulated user interactions may include any type of interactions that simulate the interactions that a user 104 may perform with webpages 112. For example, the simulated user interactions may include keystrokes that simulate a user 104 using a keyboard connected to device 106 to navigate webpage 112. As another example, the simulated user interactions may include information associated with cursor movements and/or clicks that simulate a user 104 using a mouse connected to device 106 to navigate webpage 112. As a further example, the simulated user interactions may include information that simulates one or more gestures that a user 104 may perform on display 108 to navigate webpage 112. The operation of human interaction simulator 140 is described in further detail below, in the discussion of FIG. 3.

Compliance detector 142 may be a sub-processing component of webpage accessibility tool 102. For example, compliance detector 142 may include non-transitory computer readable instructions stored in memory 134 and executed by processor 132. An example algorithm for compliance detector 142 is as follows: (1) monitor the behavior of browser 110 (e.g., the website under consideration) in response to human interaction simulator 140 executing a simulated user interaction with webpage 112, displayed in browser 110, (2) provide the behavior of browser 110 to machine learning algorithm 136, (3) apply machine learning algorithm 136 to determine if the resulting behavior of browser 110 is consistent with ADA compliance, and (4) if the resulting behavior of browser 110 is not consistent with ADA compliance, record a compliance issue in error log 124.

In certain embodiments, compliance detector 142 is configured to perform a static code analysis of the html code associated with webpage 112 and to identify any ADA compliance issues based on such a code analysis. For example, compliance detector 142 may compare the html code associated with webpage 112 with ADA rules 126 and identify areas in which the html code does not conform with ADA rules 126. As an example, ADA rules 126 may include a requirement that when any images are displayed on webpage 112, the html code of webpage 112 includes an alternative text description for each image that screen reader 114 may read, to provide user 104 with a description of the image. Accordingly, compliance detector 142 may identify a compliance issue with webpage 112 by analyzing the html code of webpage 112 and determining that the html code does not include an alternative text description of an image displayed on webpage 112. The operation of compliance detector 142 is described in further detail below, in the discussion of FIG. 3.

Processor 132 is any electronic circuitry, including, but not limited to microprocessors, application specific integrated circuits (ASIC), application specific instruction set processor (ASIP), and/or state machines, that communicatively couples to memory 134 and controls the operation of webpage accessibility testing tool 102. Processor 132 may be 8-bit, 16-bit, 32-bit, 64-bit or of any other suitable architecture. Processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 132 may include other hardware and software that operates to control and process information. Processor 132 executes software stored on memory to perform any of the functions described herein. Processor 132 controls the operation and administration of webpage accessibility tool 102 by processing information received from network 120, device 106, and memory 134. Processor 132 may be a programmable logic device, a microcontroller, a microprocessor, any suitable processing device, or any suitable combination of the preceding. Processor 132 is not limited to a single processing device and may encompass multiple processing devices.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 134, a disk, a CD, or a flash drive. In particular embodiments, the software may include an application executable by processor 132 to perform one or more of the functions described herein.

In certain embodiments, memory 134 is also configured to store machine learning algorithm 136. Machine learning algorithm 136 is any algorithm configured to determine whether webpage 112 is compliant with ADA rules 126. For example, machine learning algorithm 136 may be an algorithm configured to determine whether webpage 112 is compliant with ADA rules 126 based on the behavior of browser 110 (which is used to display webpage 112) in response to webpage accessibility testing tool 105 performing one or more simulated user interactions on webpage 112. An example of the operation of machine learning algorithm 136 is provided below, in the discussion of FIG. 3.

Database 122 may store error log 124, ADA rules 126, test scripts 128, and historical data 130. Error log 124 may include a list of ADA rule violations and/or compliance issues associated with webpage 112. For example, when webpage accessibility tool 102 detects an ADA compliance issue with webpage 112, it may store a record of the issue in error log 124. In certain embodiments, error log 124 may additionally include a complete log of all of the operations performed by webpage accessibility tool 102. In certain embodiments, database 122 may store an error log 124 for each webpage 112 tested by webpage accessibility tool 102 for ADA compliance.

ADA rules 126 include rules that a webpage should follow in order to be compliant with the ADA. For example, ADA rules 126 may include rules that, if satisfied by webpage 112, help to ensure that the developers of the webpage are free from liability. ADA rules 126 may include Web Content Accessibility Guidelines (WCAG). For example, ADA rules 126 may include rules associated with WCAG 2.0 Level A, WCAG 2.0 Level AA, and/or WCAG 2.0 Level AAA. This may be desirable as the United States government may indicate that website developers may avoid liability if their websites comply with a given level of WCAG. For example, webpage 112 may be deemed ADA compliant for purposes of avoiding liability if it satisfies WCAG 2.0 Level AA. ADA rules 126 may include any suitable rules for helping to ensure that webpage 112 is accessible to all users 104. As specific examples, ADA rules 126 may include rules specifying that the html code associated with webpage 112 include alternative text for any images displayed on webpage 112; webpage 112 present content in a meaningful order; webpage 112 does not rely on color alone to convey information; all content and functions of webpage 112 are accessible by keyboard; a user 104 of webpage 112 has the option to disable any time limits on webpage 112; the purpose of each link on webpage 112 is clear; and/or any other suitable rules related to the accessibility of webpage 112. In certain embodiments, ADA rules 126 may include custom rules developed by system administrators.

In certain embodiments, database 122 may include test scripts 128. Test scripts 128 may include information that may be used by webpage accessibility tool 102 to determine whether webpage 112 is ADA compliant. For example, test scripts 128 may indicate the actions that user 104 should be able to perform with webpage 112 and/or the order by which elements of webpage 112 should be presented to user 104. As an example, test script 128 may indicate that when first landing on webpage 112, user 104 should be presented with the option of accessing a login page. An example of the use of test scripts 128 by webpage accessibility tool 102 is presented below, in the discussion of FIG. 3.

Historical data 130 may include any appropriate data that may be used to train machine learning algorithm 136 to determine the ADA compliance of webpage 112, as described above, in the discussion of machine learning trainer 138. For example, in certain embodiments, historical data 130 may include data obtained during prior manual ADA testing sessions (e.g., testing sessions performed by users 104). As another example, in some embodiments, historical data 130 may include data obtained during previous ADA testing sessions performed by webpage accessibility tool 102. For example, historical data 130 may include data associated with previous determinations of ADA compliance and/or non-compliance along with indications of whether those previous determinations were correct.

Modifications, additions, or omissions may be made to the systems described herein without departing from the scope of the invention. For example, system 100 may include any number of users 104, devices 106, displays 108, networks 120, and databases 122. The components may be integrated or separated. Moreover, the operations may be performed by more, fewer, or other components. Additionally, the operations may be performed using any suitable logic comprising software, hardware, and/or other logic.

II. Example ADA Compliance Testing Plug-In

As described above, in certain embodiments, system 100 may include plug-in 116. Plug-in 116 may be installed on device 106 and may run in browser 110, to supplement the browser's native capability. Plug-in 116 may include webpage accessibility tool 102 (e.g., webpage accessibility tool 102 may be installed directly on device 106) or may communicate with webpage accessibility tool 102 over network 120. Plug-in 116 is configured to operate in conjunction with screen reader 114 and webpage accessibility tool 102 to test the ADA compliance of a webpage 112 loaded in browser 110. For example, plug-in 116 may receive voice signals 144 generated by screen reader 114 and provide the voice signals to webpage accessibility tool 102.

Figure 2:
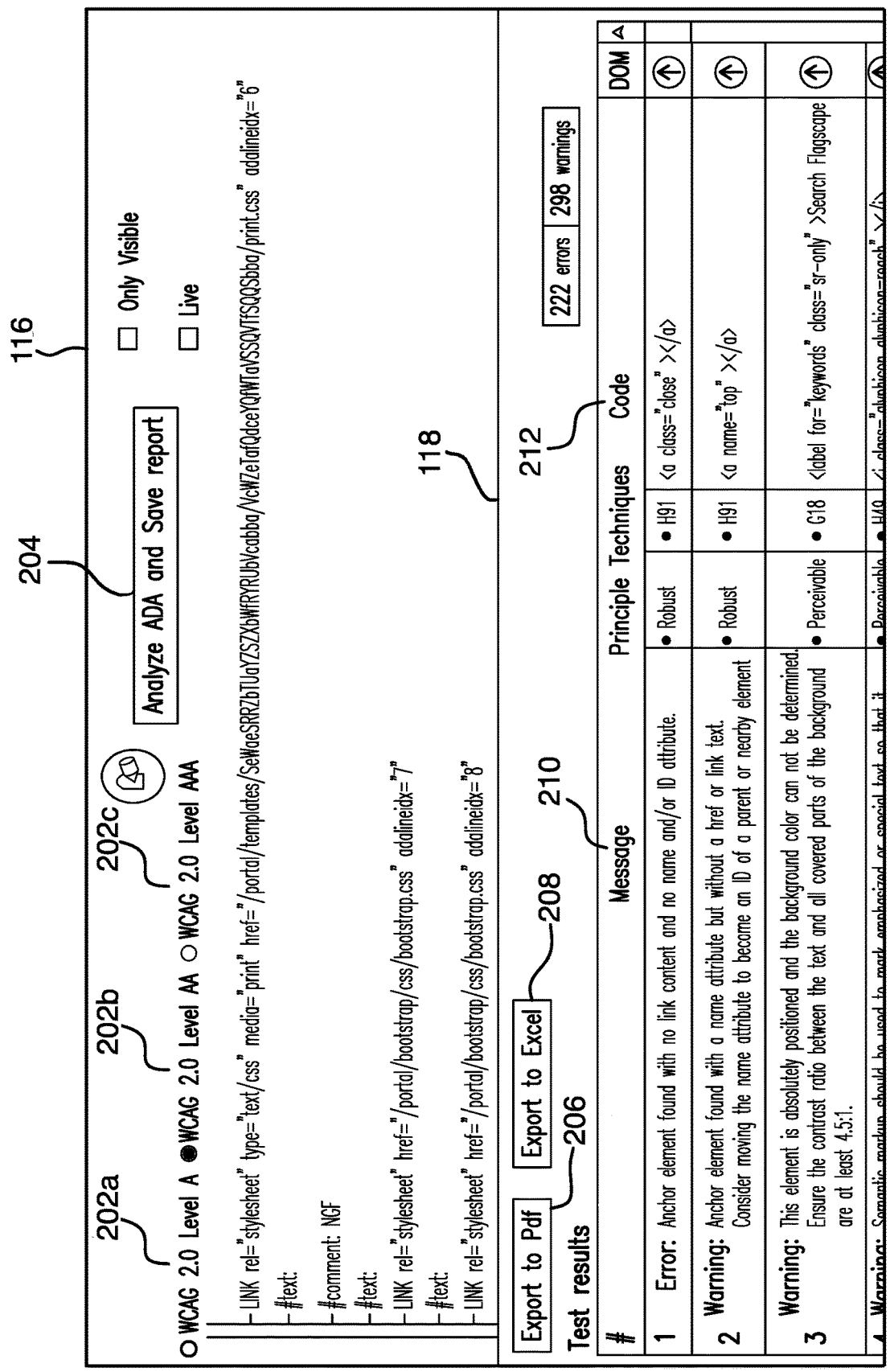
FIG. 2 presents an example website plug-in illustrating results of ADA compliance testing performed by the webpage accessibility tool of the system of FIG. 1.

In certain embodiments, plug-in 116 is configured to display the results of the ADA compliance testing of webpage 112 within browser 110. For example, plug-in 116 may display the results of the ADA compliance testing in portion 118 of browser 110. FIG. 2 presents an example of plug-in 116.

As illustrated in FIG. 2, in certain embodiments, a user 104 may begin ADA compliance testing of a webpage 112 by selecting button 204 of plug-in 116. In certain embodiments, selecting button 204 may result in plug-in 116 launching screen reader 114, and providing voice signals 144 generated by screen reader 114 to webpage accessibility tool 102. Webpage accessibility tool 102 may then simulate user interactions with webpage 112, based on the received voice signals 144, and monitor the resulting behavior of browser 110 to determine the ADA compliance of the webpage. In some embodiments, selecting button 204 may result in plug-in 116 using compliance detector 142 to perform a static code analysis of the html code associated with webpage 112.

In certain embodiments, plug-in 116 may enable user 104 to specify the ADA rules 126 that webpage accessibility tool 102 is to apply to the compliance testing of webpage 112. For example, user 104 may select from amongst options 202a through 202c, to indicate that compliance detector 142 should use either WCAG 2.0 Level A, AA, or AAA rules, when determining the ADA compliance of webpage 112.

In response to performing ADA compliance testing on webpage 112, plug-in 116 may display the results of the testing in region 118. In certain embodiments, user 104 may choose to save the results as a pdf file, by selecting butting 206, and/or as an Excel file, by selecting button 208. As illustrated in FIG. 2, results 118 may include messages 210 identifying one or more potential compliance issues with webpage 112, discovered during the testing. Results 118 may also include suggestions 212 of ways to remediate the identified issues. In this manner, plug-in 116 may be used by a system administer to streamline the process of identifying and remediating ADA compliance issues with webpages 112.

III. Example Operation of the Webpage Accessibility Tool

Figure 3:
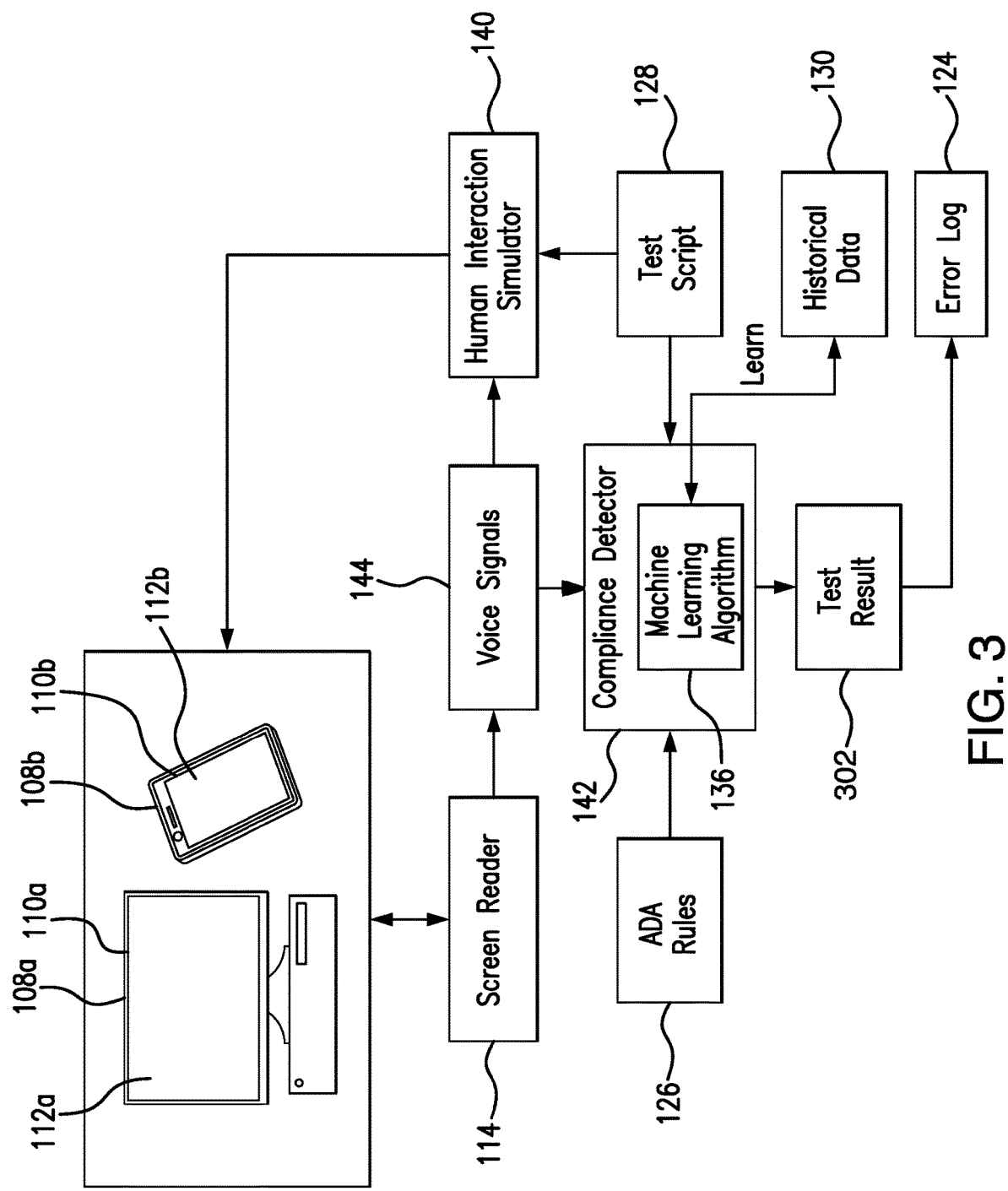
FIG. 3 illustrates an example operation of the webpage accessibility tool of the system of FIG. 1.

FIG. 3 presents an example operation of webpage accessibility tool 102. In certain embodiments, webpage accessibility tool 102 may begin the testing process by loading webpage 112 into browser 110 and launching screen reader 114. For example, in certain embodiments, webpage accessibility tool 102 may receive an indication from plug-in 116 that user 104 wishes to begin ADA compliance testing of a website to which webpage 112 belongs. In response, webpage accessibility tool 102 may instruct plug-in 116 to load webpage 112 into browser 110 and/or to launch screen reader 114. In certain embodiments, webpage 112 may be a homepage of the website to which webpage 112 belongs. In some embodiments, webpage accessibility tool 102 may begin the testing process simply by waiting to receive voice signals 144 from screen reader 114.

Screen reader 114 generates voice signals 144 while reading/processing webpage 112. Voice signals 144 may include descriptions of the content of webpage 112 and/or instructions for navigating the content of webpage 112. For example, a given voice signal 144 may be associated with an element of webpage 112 (or an element of a larger website that includes webpage 112), to which user 104 may navigate in response to receiving voice signal 144. As an example, voice signal 144 may indicate that user 104 may access an element of the website to which webpage 112 belongs, by selecting a link on webpage 112.

Webpage accessibility tool 102 receives voice signals 144 from screen reader 114 and uses human interaction simulator 140 to process such signals. For example, human interaction simulator 140 may include a voice-to-text algorithm configured to convert voice signals 144 into text. Human interaction simulator 140 may also include a machine learning algorithm configured to convert the text generated by the voice-to-text algorithm into one or more input commands configured to simulate the interactions that user 104 might perform with webpage 112, in response to receiving voice signals 144. For example, screen reader 120 may generate voice signals 144 that provide instructions identifying a number of links on webpage 112 that user 104 may select from amongst using the TAB key on his/her keyboard. Human interaction simulator 140 may then convert such voice signals 144 into input commands configured to simulate the behavior of user 104, in response to receiving voice signals 144. For example, human interaction simulator 140 may generate input commands configured to simulate the behavior of user 104 when the user enters the TAB key one or more times on his/her keyboard. This disclosure contemplates that human interaction simulator 140 may be configured to simulate any interactions that user 104 might perform with webpage 112. For example, human interaction simulator 140 may be configured to generate input commands configured to simulate user 104 interacting with webpage 112 by (1) using a keyboard connected to device 106, (2) using a mouse connected to device 106, (3) gesturing on display 108, and/or (4) performing any other suitable action.

In certain embodiments, human interaction simulator may use test script 128a when simulating the behavior of user 104. For example, test script 128a may include instructions indicating aspects of a website that webpage accessibility tool 102 should test for ADA compliance and/or a description of operations that user 104 should be able to perform with the website. As an example, test script 128a may indicate that the first action user 104 should be able to perform with webpage 112, after webpage 112 is loaded in browser 110, is to access a link on webpage 112 through which the user may navigate to a login page. Accordingly, in response to receiving voice signals 144, human interaction simulator 140 may wait until it receives a voice signal 144 identifying a link on webpage 112 through which a user may access the login page, and may then generate input commands configured to simulate an attempt by a user to access the link to the login page.

In response to human interaction simulator 140 generating input commands configured to simulate the behavior of a user interacting with webpage 112, human interaction simulator 140 is configured to execute the input commands, thereby simulating the behavior of a low-vision user interacting with the webpage. Compliance detector 142 is then configured to monitor the behavior of browser 110, in response to the executed input commands, and to determine if such behavior is consistent with ADA compliance. This disclosure contemplates that compliance detector 142 may determine whether the resulting behavior is consistent with ADA compliance in any suitable manner. For example, consider the situation described above, in which test script 128a indicates that the first action a user 104 should be able to perform with webpage 112 is to access a link on the webpage through which the user may navigate to a login page. In such a situation, compliance detector 142 may determine that the behavior is not consistent with ADA compliance if, in response to human interaction simulator 140 executing the input commands to access the link to the login page, the browser does not load a login page. As another example, in the situation described above, compliance detector 142 may determine that the behavior is not consistent with ADA compliance if, instead of loading a login page, browser 110 loads multiple additional pages with which a user 104 may need to interact prior to being able to access the login page. Here, compliance detector 142 may determine that even though a user 104 is able to access the login page based on voice signals 144 received from screen reader 114, the process that the user must follow is too cumbersome to satisfy ADA compliance. On the other hand, compliance detector 142 may nevertheless determine that the behavior is consistent with ADA compliance even if a user 104 may need to interact with a second link and/or webpage in order to actually access the login page (rather than being able to access the login page directly from the first link), because the second link adds minimal complexity to the process of accessing the login page. As a further example, compliance detector 142 may determine that the behavior is not consistent with ADA compliance, if human interaction simulator 140 received a large number of voice signals 144 prior to receiving a voice signal 144 providing instructions for user 104 to access the login page, because test script 128a indicated that user 104 should be able to access the login page shortly after webpage 112 is loaded into browser 110.

Compliance detector 142 may be configured to monitor the behavior of browser 110 in response to human interaction simulator 140 entering one or more input commands configured to simulate user interactions with webpage 112 in any suitable manner. For example, in certain embodiments, monitoring the behavior of browser 110 includes monitoring the voice signals 144 received from screen reader 114 after human interaction simulator 140 has executed the input commands. As another example, in certain embodiments, monitoring the behavior of browser 110 includes analyzing the html code of the webpage displayed in browser 110 after human interaction simulator 140 has executed the input commands.

In certain embodiments, compliance detector 142 may use machine learning algorithm 136 to determine whether webpage 112 is ADA compliant. Machine learning algorithm 136 may include any algorithm configured to identify ADA compliance issues associated with webpage 112 based on: (1) ADA rules 126, (2) voice signals 144 generated by screen reader 114 while reading webpage 112, (3) the behavior of browser 110 in response to human interaction simulator 140 executing an input command configured to simulate an interaction between a user and webpage 112, based on voice signals 144, (4) any information that may be provided in test scripts 128, and/or (5) any other suitable information. Machine learning algorithm 136 may be trained to identify ADA compliance issues with webpage 112, based on information gathered during prior ADA compliance testing sessions and stored as historical data 130, in database 122.

In certain embodiments, compliance detector 142 may be configured to identify ADA compliance issues with webpage 112 based on a static analysis of the html code associated with webpage 112. For example, compliance detector 142 may compare the html code associated with webpage 112 with ADA rules 126 and identify areas in which the html code does not conform with ADA rules 126, as described above, in the discussion of FIG. 1.

In embodiments in which test script 128a indicates a number of aspects of a website that webpage accessibility tool 102 should test for ADA compliance, compliance detector 142 may generate test results 302 indicating whether or not each such aspect is ADA compliant. In some embodiments, compliance detector 142 may identify compliance issues associated with webpage 112 in error log 124, stored in database 122. In certain embodiments, plug-in 116 is configured to display error log 124 or a portion of error log 124 in browser 110, as results 118. In this manner, a system administrator may use plug-in 116 and/or webpage accessibility tool 105 to quickly and easily identify and remediate ADA compliance issues for webpage 112.

Figure 4:
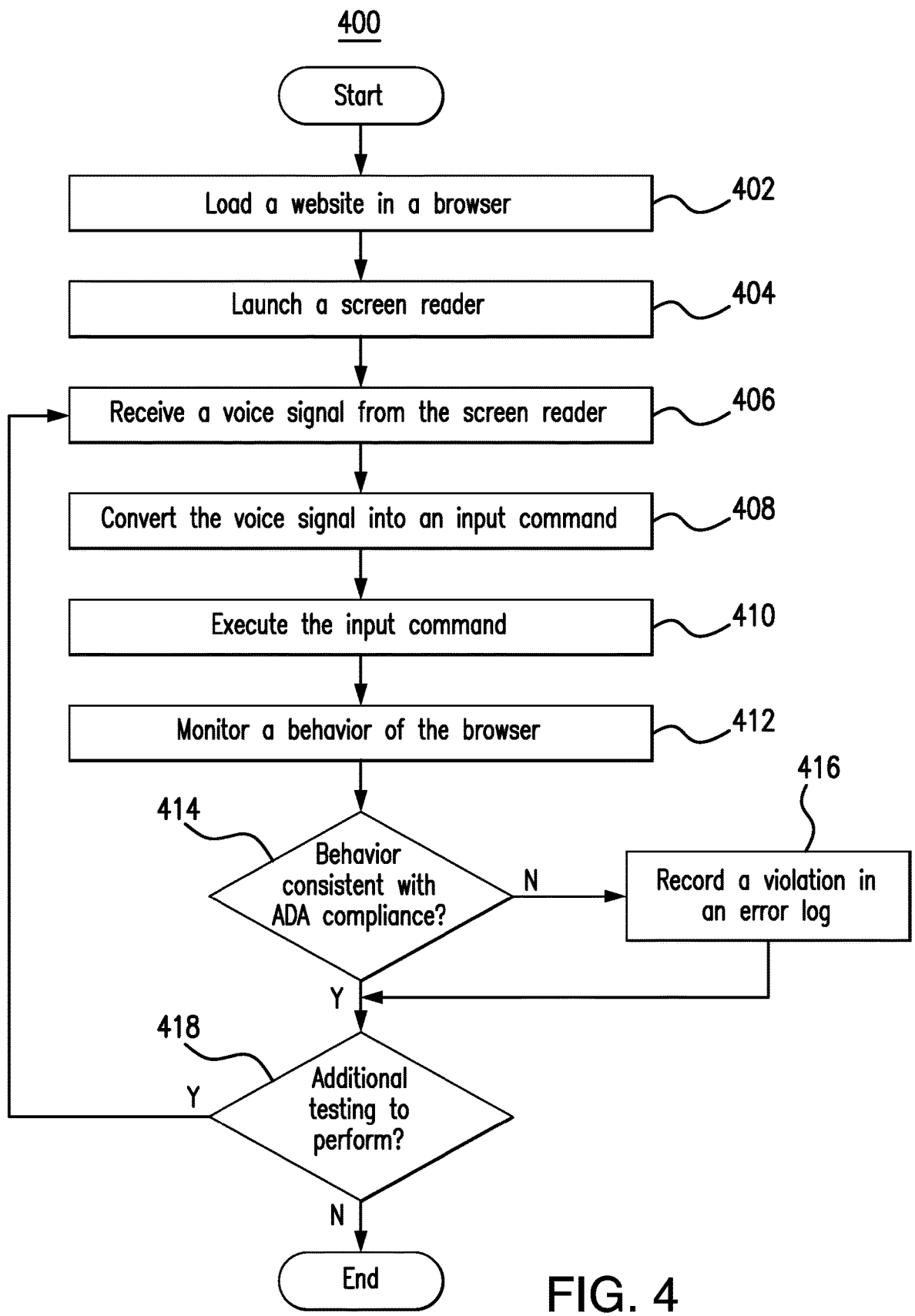
FIG. 4 presents a flowchart illustrating the process used by the webpage accessibility tool of the system of FIG. 1 to test a website for ADA compliance.

FIG. 4 presents a flow chart illustrating the process used by webpage accessibility tool 102 to test a website for ADA compliance. In step 402, the tool loads the website into browser 110. Loading the website into browser 110 may include loading a webpage 112 belonging to the website into the browser. This disclosure contemplates that the website includes one or more elements, where each element corresponds to content that may be displayed by the website and/or may be accessible through the website. For example, an element may be an image, a video, a file, a login page, a portion of text, and/or any other content that may be displayed by the website and/or made accessible to a user through the website.

In step 404, tool 102 launches screen reader 114. Screen reader 114 is configured to read and/or process the content of the webpage displayed in browser 110, in order to generate voice signals 144 that may be used by low-vision users 104 to navigate around the website. For example, each voice signal 144 may be associated with one or more elements of the website and may provide information that may be used by users 104 to navigate to the one or more elements. In step 406, tool 102 receives a voice signal 144 from screen reader 114. In certain embodiments, tool 102 may listen for a particular voice signal 144 based on information included in a test script 128. For example, test script 128 may indicate that the first action that a user should be able to perform when visiting the website is to access a login page. Accordingly, tool 102 may listen for a voice signal 144 associated with the login page. For example, tool 102 may listen for a voice signal 144 describing a link that leads to the login page.

In step 408, tool 102 converts the voice signal 144 into an input command. For example, if voice signal 144 is associated with a first element of the website, tool 102 may convert the voice signal into an input command that, when executed, simulates the behavior of a user navigating to the first element. In step 410, tool 102 executes the input command. In step 412 tool 102 monitors a behavior of browser 110 in response to tool 102 executing the input command. For example, tool 102 determines the manner by which webpage 112 and/or any information displayed by webpage 112 changes, in response to tool 102 executing the input command. In step 414, tool 102 determines whether the behavior of the website in response to tool 102 executing the input command is consistent with ADA compliance. In certain embodiments, tool 102 determines whether the behavior is consistent with ADA compliance by using a machine learning algorithm 136 trained to make such determinations. For example, machine learning algorithm 136 may be configured to assign a probability to the behavior, where the probability indicates the likelihood that the behavior is consistent with ADA compliance. Tool 102 may then determine whether the behavior is consistent with ADA compliance by comparing the probability to a set threshold. For example, tool 102 may determine that the behavior is consistent with ADA compliance if machine learning algorithm 136 determines that the probability that the behavior is consistent with ADA compliance is greater than 90%.

In certain embodiments, determining whether the behavior is consistent with ADA compliance may include determining whether the cumulative behavior of the website, in response to tool 102 executing a series of input commands, is consistent with ADA compliance. For example, a user may need to interact with a website multiple times before being able to access a given element of the website. As an example, in attempting to access an account balance, a user may need to navigate from a homepage to a login page and then to an account information page, before being able to select a link to access the account balance. Accordingly, determining whether the website is ADA compliant may include starting at the homepage and attempting to access the account balance by navigating through the website according to multiple voice signals 144.

If, in step 414, tool 102 determines that the behavior is not consistent with ADA compliance, in step 416, tool 102 records details of the compliance issue in error log 124. If, in step 414, tool 102 determines that the behavior is consistent with ADA compliance, in step 418 tool 102 determines whether there is any additional ADA compliance testing to perform. For example, in embodiments in which tool 102 is following test script 128, tool 102 may determine whether test script 128 indicates other features of the website that tool 102 should test for ADA compliance.

If, in step 418, tool 102 determines that there is additional ADA compliance testing to perform, the method returns to step 406, where tool 102 continues to receive voice signals from screen reader 114.

Modifications, additions, or omissions may be made to method 400 depicted in FIG. 4. Method 400 may include more, fewer, or other steps. For example, steps may be performed in parallel or in any suitable order. While discussed as website accessibility tool 102 (or components thereof) performing the steps, any suitable component of system 100, such as device(s) 106 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. A system comprising:
  a memory configured to store:
    a screen reader application; and
    a machine learning algorithm;
  a display configured to display a browser; and
  a hardware processor communicatively coupled to the memory, the hardware processor configured to:

load a website comprising a plurality of elements into the browser;
launch the screen reader application, wherein the screen reader application is configured to generate audio signals associated with the plurality of elements;
receive a first audio signal generated by the screen reader application, the first audio signal providing instructions for navigating to a first element of the plurality of elements, wherein the instructions describe a first user interaction to be performed by a user using a user interface communicatively coupled to the processor, in order to instruct the processor to cause the browser to navigate to the first element;
in response to receiving the first audio signal, determine, based on the first audio signal and a testing script, to simulate a performance of the first user interaction by the user, wherein the testing script identifies the first element; and
in response to determining to simulate the performance of the first user interaction by the user:
generate, based on the first audio signal, a first executable command, wherein, when executed by the processor, the first executable command is configured to simulate the performance of the first user interaction by the user, by causing the browser to navigate to the first element;
execute the first executable command; and
in response to executing the first executable command:
monitor a first behavior of the browser;
apply the machine learning algorithm to the first behavior of the browser to determine whether the website is compliant with a set of rules, the machine learning algorithm configured to determine whether the website is compliant with the set of rules, based at least in part on the first audio signal and the first behavior of the browser; and
in response to determining that the website is not compliant with the set of rules, record a violation associated with the first audio signal in an error log.

2. The system of claim 1, wherein the hardware processor is further configured to display the error log on the display.

3. The system of claim 1, wherein the first user interaction comprises at least one of:
entering a keystroke on a keyboard;
motioning on the display; and
clicking a mouse button.

4. The system of claim 1, wherein generating the first executable command comprises:
converting the first audio signal into text; and
applying a machine learning algorithm to the text, the machine learning algorithm trained to generate the first executable command based on the text.

5. The system of claim 1, wherein:
the website comprises html code; and
the hardware processor is further configured to:
scan the html code;
determine, based on an absence of an html tag in the html code, that the website is not compliant with the set of rules; and
in response to determining that the website is not compliant with the set of rules, record a violation associated with the absence of the html tag in the error log.

6. The system of claim 1, wherein the hardware processor is further configured to, in response to executing the first executable command:
receive a second audio signal generated by the screen reader application, the second audio signal providing instructions for navigating to a second element of the plurality of elements, wherein the instructions for navigating to the second element describe a second user interaction to be performed by the user to instruct the processor to cause the browser to navigate to the second element;
in response to receiving the second audio signal:
generate, based on the second audio signal, a second executable command, wherein, when executed by the processor, the second executable command is configured to simulate performance of the second user interaction by the user, by causing the browser to navigate to the second element;
execute the second executable command; and
in response to executing the second executable command, monitor a second behavior of the browser, wherein the machine learning algorithm is further configured to determine whether the website is compliant with the set of rules based on the second audio signal, and the second behavior of the browser.

7. The system of claim 1, wherein monitoring the first behavior of the browser comprises receiving a second audio signal generated by the screen reader application and analyzing the second audio signal.

8. A method comprising:
loading a website comprising a plurality of elements into a browser;
launching a screen reader application, wherein the screen reader application is configured to generate audio signals associated with the plurality of elements;
receiving a first audio signal generated by the screen reader application, the first audio signal providing instructions for navigating to a first element of the plurality of elements, wherein the instructions describe a first user interaction to be performed by a user using a user interface, in order to instruct a processor to cause the browser to navigate to the first element;
in response to receiving the first audio signal, determining, based on the first audio signal and a testing script, to simulate a performance of the first user interaction by the user, wherein the testing script identifies the first element; and
in response to determining to simulate the performance of the first user interaction by the user:
generating, based on the first audio signal, a first executable command, wherein, when executed by the processor, the first executable command is configured to simulate the performance of the first user interaction by the user, by causing the browser to navigate to the first element;
executing the first executable command; and
in response to executing the first executable command:
monitoring a first behavior of the browser;
applying a machine learning algorithm to the first behavior of the browser to determine whether the website is compliant with a set of rules, the machine learning algorithm configured to determine whether the website is compliant with the set of rules, based at least in part on the first audio signal and the first behavior of the browser; and in response to determining that the website is not compliant with the set of rules, recording a violation associated with the first audio signal in an error log.

9. The method of claim 8, further comprising displaying the error log.

10. The method of claim 8, wherein the first user interaction comprises at least one of:
entering a keystroke on a keyboard;
motioning on the display; and
clicking a mouse button.

11. The method of claim 8, wherein generating the first executable command comprises:
converting the first audio signal into text; and
applying a machine learning algorithm to the text, the machine learning algorithm trained to generate the first executable command based on the text.

12. The method of claim 8, wherein the website comprises html code, the method further comprising:
scanning the html code;
determining, based on an absence of an html tag in the html code, that the website is not compliant with the set of rules; and
in response to determining that the website is not compliant with the set of rules, recording a violation associated with the absence of the html tag in the error log.

13. The method of claim 8, further comprising, in response to executing the first executable command:
receiving a second audio signal generated by the screen reader application, the second audio signal providing instructions for navigating to a second element of the plurality of elements, wherein the instructions for navigating to the second element describe a second user interaction to be performed by the user to instruct the processor to cause the browser to navigate to the second element;
in response to receiving the second audio signal:
generating, based on the second audio signal, a second executable command, wherein, when executed by the processor, the second executable command is configured to simulate performance of the second user interaction by the user, by causing the browser to navigate to the second element;
executing the second executable command; and
in response to executing the second executable command, monitoring a second behavior of the browser, wherein the machine learning algorithm is further configured to determine whether the website is compliant with the set of rules based on the second audio signal, and the second behavior of the browser.

14. The method of claim 8, wherein monitoring the first behavior of the browser comprises receiving a second audio signal from the screen reader application and analyzing the second audio signal.

15. An apparatus comprising:
a memory; and
a hardware processor communicatively coupled to the memory, the hardware processor configured to:
receive a first audio signal generated by a screen reader application, the first audio signal providing instructions for navigating to a first element of a website that is displayed by a browser, wherein the instructions describe a first user interaction to be performed by a user using a user interface communicatively coupled to the processor, in order to instruct the processor to cause the browser to navigate to the first element of the website;
in response to receiving the first audio signal, determine, based on the first audio signal and a testing script, to simulate a performance of the first user interaction by the user, wherein the testing script identifies the first element; and
in response to determining to simulate the performance of the first user interaction by the user:
generate, based on the first audio signal, a first executable command, wherein, when executed by the processor, the first executable command is configured to simulate the performance of the first user interaction by the user, by causing the browser to navigate to the first element;
execute the first executable command; and
in response to executing the first executable command:
monitor a first behavior of the browser;
apply a machine learning algorithm to the first behavior of the browser to determine whether the website is compliant with a set of rules, the machine learning algorithm configured to determine whether the website is compliant with the set of rules, based at least in part on the first audio signal and the first behavior of the browser; and
in response to determining that the website is not compliant with the set of rules, record a violation associated with the first audio signal in an error log.

16. The apparatus of claim 15, wherein the hardware processor is further configured to display the error log in the browser.

17. The apparatus of claim 15, wherein the first user interaction comprises at least one of:
entering a keystroke on a keyboard;
motioning on the display; and
clicking a mouse button.

18. The apparatus of claim 15, wherein generating the first executable command comprises:
converting the first audio signal into text; and
applying a machine learning algorithm to the text, the machine learning algorithm trained to generate the first executable command based on the text.

19. The apparatus of claim 15, wherein:
the website comprises html code; and
the hardware processor is further configured to:
scan the html code;
determine, based on an absence of an html tag in the html code, that the website is not compliant with the set of rules; and
in response to determining that the website is not compliant with the set of rules, record a violation associated with the absence of the html tag in the error log.

20. The apparatus of claim 15, wherein the hardware processor is further configured to, in response to executing the first executable command:
receive a second audio signal generated by the screen reader application, the second audio signal providing instructions for navigating to a second element of the website, wherein the instructions for navigating to the second element describe a second user interaction to be performed by the user to instruct the processor to cause the browser to navigate to the second element;

in response to receiving the second audio signal:
- generate, based on the second audio signal, a second executable command, wherein, when executed by the processor, the second executable command is configured to simulate performance of the second user interaction by the user, by causing the browser to navigate to the second element;
- execute the second executable command; and
- in response to executing the second executable command, monitor a second behavior of the browser, wherein the machine learning algorithm is further configured to determine whether the website is compliant with the set of rules based on the second audio signal and the second behavior of the browser.

\* \* \* \* \*